US011214204B2

(12) United States Patent
Riffe (10) Patent No.: US 11,214,204 B2
(45) Date of Patent: Jan. 4, 2022

(54) MULTI-FUNCTION CONVERTIBLE TRUCK CARGO BED LINER

(71) Applicant: Toyota Motor Engineering & Manufacturing North America, Inc., Plano, TX (US)

(72) Inventor: Jessica A. Riffe, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 147 days.

(21) Appl. No.: 16/694,445

(22) Filed: Nov. 25, 2019

(65) Prior Publication Data

US 2021/0155169 A1  May 27, 2021

(51) Int. Cl.
  *B60R 13/01* (2006.01)
(52) U.S. Cl.
  CPC .................................. *B60R 13/01* (2013.01)
(58) Field of Classification Search
  CPC . B60R 13/01; B60R 13/011; B60R 2013/015; B60R 2013/018
  USPC ...................... 296/39.1, 39.2, 97.23; 105/423
  See application file for complete search history.

(56) References Cited

U.S. PATENT DOCUMENTS

| 4,279,439 A | 7/1981 | Cantieri |
| 4,673,207 A | 6/1987 | Reynolds et al. |
| 4,789,574 A | 12/1988 | Selvey |
| 4,860,777 A | 8/1989 | Orlando |
| 4,893,862 A | 1/1990 | Hollenbaugh, Sr. |
| 4,990,049 A | 2/1991 | Hargrove |
| 5,007,670 A | 4/1991 | Wise |
| 5,154,478 A | 10/1992 | Erickson et al. |
| 5,312,149 A | 5/1994 | Boone |
| 5,360,250 A * | 11/1994 | Wood ...................... B60R 13/01 296/39.2 |
| 5,378,034 A | 1/1995 | Nelsen |
| 5,806,909 A | 9/1998 | Wise |
| 6,045,172 A | 4/2000 | Thomas et al. |
| 6,059,343 A | 5/2000 | Emery |
| 6,386,622 B1 | 5/2002 | Grimm et al. |
| 6,536,827 B2 | 3/2003 | Oswald et al. |
| 6,578,896 B1 | 6/2003 | Peterson |
| 10,232,793 B2 | 3/2019 | Frederick et al. |
| 2004/0084923 A1 * | 5/2004 | Song ...................... B60R 13/011 296/39.1 |
| 2005/0127700 A1 | 6/2005 | Burtin |

(Continued)

*Primary Examiner* — Stephen T Gordon
(74) *Attorney, Agent, or Firm* — Christopher G. Darrow; Darrow Mustafa PC (57) ABSTRACT

A single-piece foldable cargo area liner includes a floor portion, a front wall portion foldably connected to the floor portion, and a first sidewall portion foldably connected to the floor portion. A first foldable intersection portion has a first section and a second section foldably connected to the first section. The first section is foldably connected to the first sidewall portion, and the second section is also foldably connected to the front wall portion. The first foldable intersection portion is structured to facilitate folding of the first and second sections with respect to each other so as to form a first flap extending between the front wall portion and the first sidewall portion. The first flap is structured to be rotatable to enable contact between the first flap and any of the front wall portion and the first sidewall portion.

6 Claims, 7 Drawing Sheets

(56) References Cited

U.S. PATENT DOCUMENTS

| | | |
|---|---|---|
| 2008/0084083 A1 | 4/2008 | Boddie et al. |
| 2008/0303303 A1 | 12/2008 | Valentine |
| 2012/0068493 A1 | 3/2012 | Waterman |
| 2012/0187709 A1 | 7/2012 | Wise et al. |

\* cited by examiner

MULTI-FUNCTION CONVERTIBLE TRUCK CARGO BED LINER

TECHNICAL FIELD

The present invention relates to accessories for a vehicle and, more particularly, to a cargo bed liner for a truck cargo bed.

BACKGROUND

Cargo bed liners may be used to protect surfaces of a vehicle cargo bed from abrasion, scratches, etc. However, the particular shape and structure of a cargo bed liner generally precludes its use for purposes other than protecting the cargo bed.

SUMMARY

In one aspect of the embodiments described herein, a single-piece foldable cargo area liner includes a floor portion, a front wall portion foldably connected to the floor portion, and a first sidewall portion foldably connected to the floor portion. The cargo liner also includes a first foldable intersection portion having a first section and a second section foldably connected to the first section. The first section is foldably connected to the first sidewall portion, and the second section is also foldably connected to the front wall portion. The first foldable intersection portion is structured to facilitate folding of the first and second sections with respect to each other so as to form a first flap responsive to folding one of the front wall portion and the first sidewall portion with respect to the floor portion, and folding of the other one of the front wall portion and the first sidewall portion with respect to the floor portion and in a direction toward the one of the floor portion and the first sidewall portion. The first flap extends between the front wall portion and the first sidewall portion. The first flap is structured to be rotatable to enable contact between the first flap and any of the front wall portion and the first sidewall portion.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Embodiments described herein relate to a single-piece foldable cargo area liner including a floor portion, a front wall portion foldably connected to the floor portion, and a first sidewall portion foldably connected to the floor portion. A first foldable intersection portion has a first section and a second section foldably connected to the first section. The first section is foldably connected to the first sidewall portion, and the second section is also foldably connected to the front wall portion. The first foldable intersection portion is structured to facilitate folding of the first and second sections with respect to each other so as to form a first flap responsive to folding one of the front wall portion and the first sidewall portion with respect to the floor portion, and folding of the other one of the front wall portion and the first sidewall portion with respect to the floor portion and in a direction toward the one of the floor portion and the first sidewall portion. The first flap extends between the front wall portion and the first sidewall portion. The first flap is structured to be rotatable to enable contact between the first flap and any of the front wall portion and the first sidewall portion. The first flap may then be secured to one of the front wall portion and the first sidewall portion. A similar, second foldable intersection portion may be provided opposite the first foldable intersection portion, and may be folded to provide a second flap extending between the front wall portion and a second sidewall portion opposite the first sidewall portion. The second flap is structured to be rotatable to enable contact between the second flap and any of the front wall portion and the second sidewall portion. Detachably securing each of the first and second flaps to an associated wall portion may aid in maintaining the shape of the cargo bed liner. In addition, the cargo area liner may be removed from the vehicle cargo bed and unfolded for use outside the vehicle. Telescoping supports may be provided to suspend the unfolded cargo area liner above a support surface, for example, a ground surface outside the vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. Any of the components described herein may be formed from a material (or materials) suitable for the purpose(s) of the element as described herein.

Figure 1:
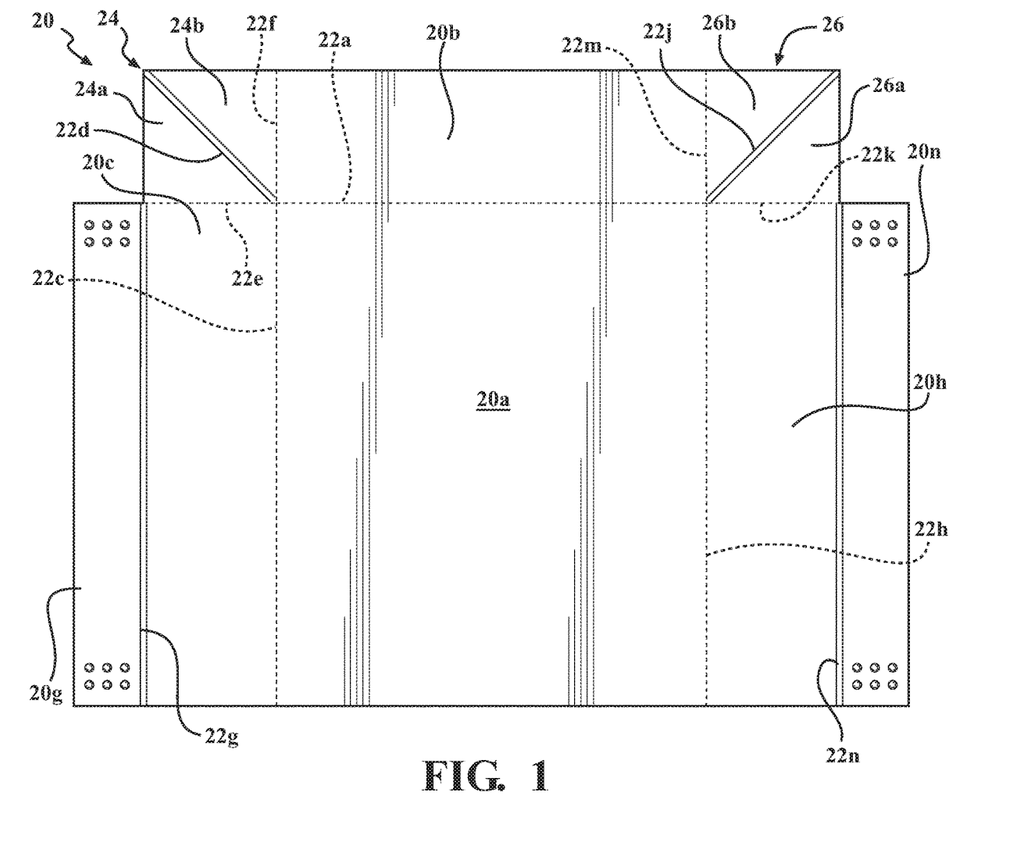
FIG. 1 is a schematic plan view of a foldable cargo area liner in accordance with one embodiment of the present invention.

FIG. 1 is a plan view of a foldable cargo area liner 20 in accordance with one embodiment of the present invention. The cargo area liner 20 may be molded or otherwise formed as a single piece including multiple portions which are formed integrally with each other and are foldably connected to each other. As used herein, "foldably connected" refers to any two adjacent portions of the liner which may be connected so as to facilitate folding and/or rotation of either adjacent portion with respect to the other adjacent portion. In one or more arrangements, adjacent portions of the liner 20 may be foldably connected by "living hinges" extending between the adjacent portions. As is known in the pertinent art, a living hinge may be formed, for example, by integrally molding two relatively thicker portions to be connected with a relatively thinner portion residing between and spacing apart and connecting the relatively thicker portions. The relatively thinner portion provides a relatively flexible hinge or connection between the relatively thicker portions, enabling and facilitating folding of either of the relatively thicker portions with respect to the other relatively thicker portion.

The cargo area liner 20 is shown in FIG. 1 in a flattened, "as molded" or unfolded condition. The cargo area liner 20 may be formed from any material suitable for formation of living hinges facilitating folding of the cargo area liner portions with respect to each other as described herein. In one particular example, the cargo area liner may be formed from a polypropylene or other suitable polymer material.

Figure 2A:
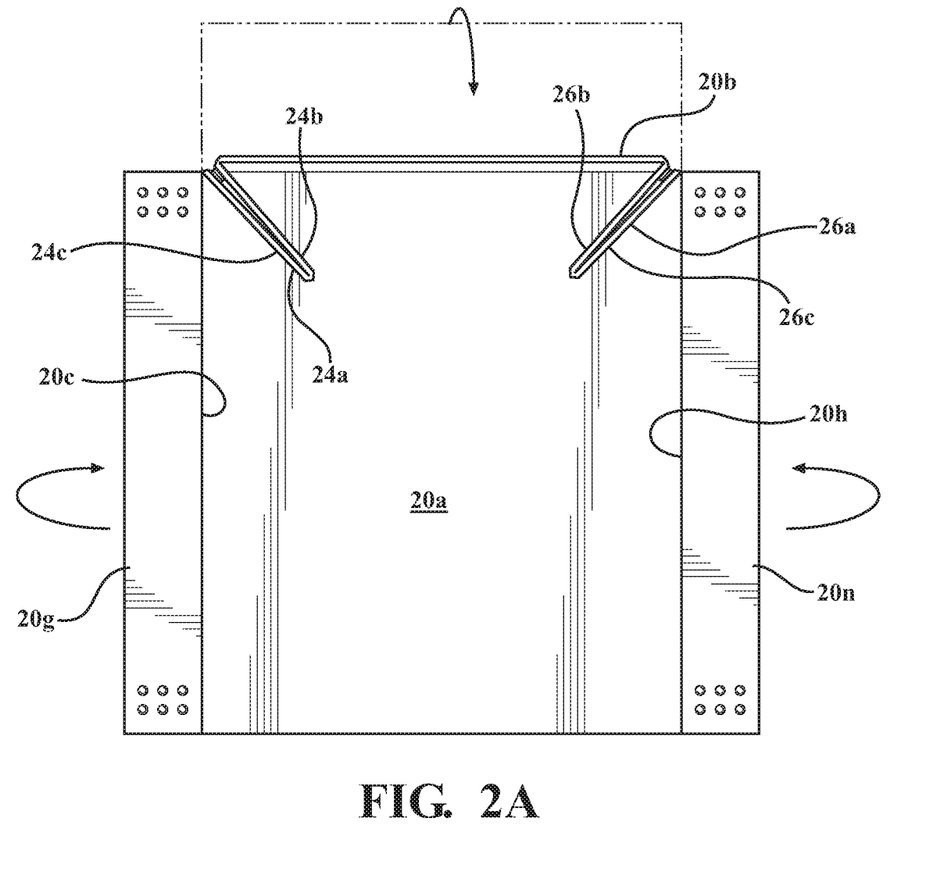
FIG. 2A is a schematic plan view of the foldable cargo area liner of FIG. 1 showing first stages of folding of the liner to configured the liner for placement in the cargo bed.
Figure 2B:
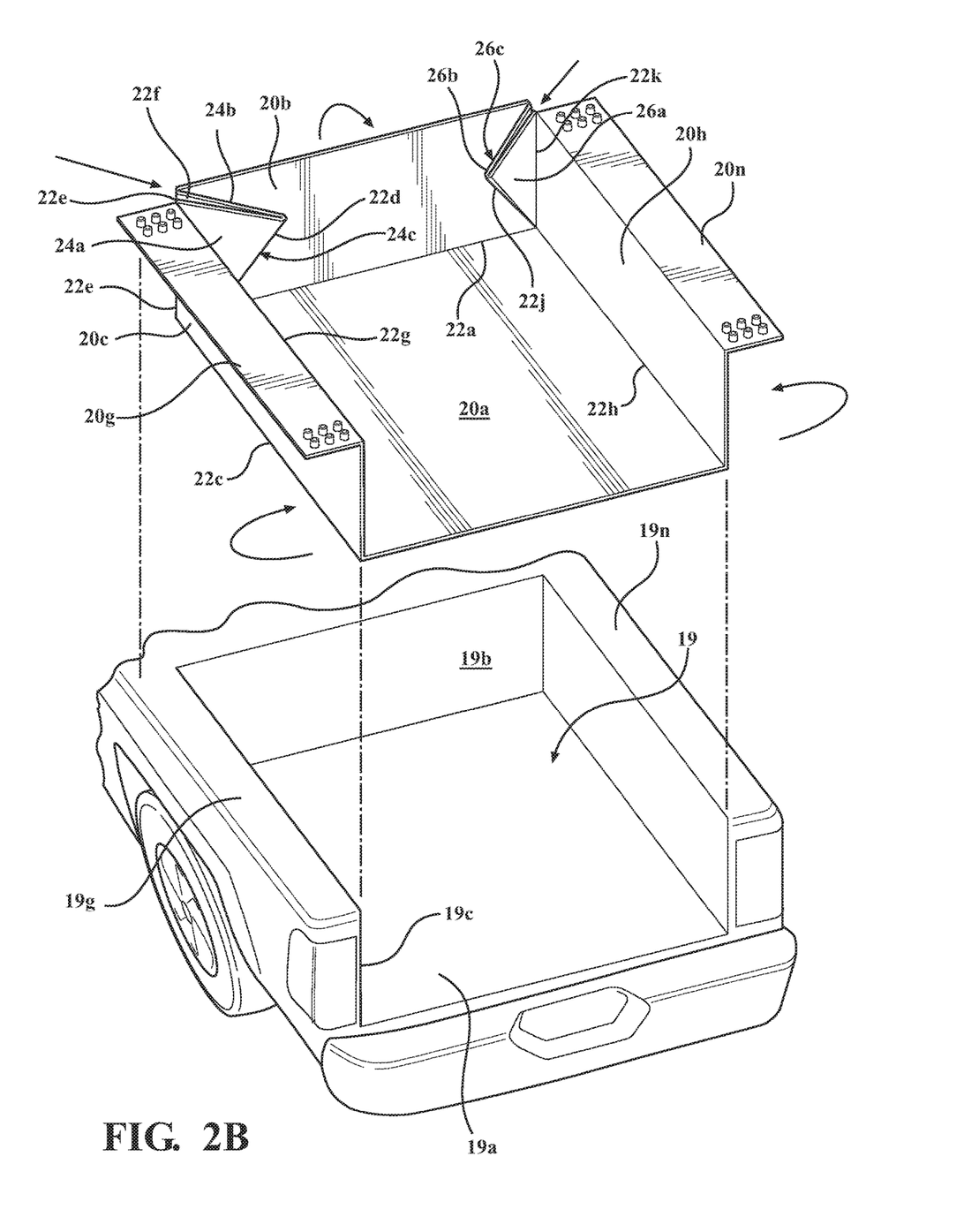
FIG. 2B is a schematic perspective view of the liner configuration shown in FIG. 2A, taken from a rear of the liner and showing the liner positioned above a vehicle cargo bed into which the liner may be inserted.

Referring to the drawings, and in particular to FIGS. 1-2B, the single-piece foldable cargo area liner 20 may include a floor portion 20a structured to reside opposite and cover a floor 19a of a vehicle cargo bed 19 when the liner 20 is mounted in the cargo bed. A front wall portion 20b may be foldably connected to the floor portion 20a by a living hinge 22a. Front wall portion 20b may be structured to reside opposite and cover a front wall 19b of the vehicle cargo bed when the liner 20 is mounted in the cargo bed.

A first sidewall portion 20c may be foldably connected to the floor portion 20a by a living hinge 22c. The first sidewall portion 20c may be structured to reside opposite and cover an interior of a first side wall 19c of the vehicle cargo bed 19 when the liner 20 is mounted in the cargo bed 19. In addition, a first foldable intersection portion 24 of the liner 20 may have a first section 24a and a second section 24b foldably connected to the first section 24a by a living hinge 22d. The first section 24a may be foldably connected to the first sidewall portion 20c by a living hinge 22e, and the second section 24b may also be foldably connected to the front wall portion 20b by a living hinge 22f.

The first foldable intersection portion 24 may be structured to facilitate folding of the first and second sections 24a, 24b with respect to each other so as to form a first flap 24c responsive to folding one of the front wall portion 20b and the first sidewall portion 20c with respect to the floor portion 20a, and subsequently folding the other one of the front wall portion 20b and the first sidewall portion 20c with respect to the floor portion 20a and in a direction toward the one of the floor portion 20a and the first sidewall portion 20b, as described herein. The first flap 24c (which may extend between the front wall portion 20b and the first sidewall portion 20c) may be structured to be rotatable to enable contact between the first flap 24c and any of the front wall portion 20b and the first sidewall portion 20c.

In addition, a first rail cover portion 20g may be foldably connected to the first sidewall portion 20c by a living hinge 22g. The first rail cover portion 20g may be structured to reside opposite and cover the top of a sidewall rail 19g of the vehicle cargo bed 19 when the liner 20 is mounted in the cargo bed.

The first rail cover portion 20g may include a plurality of retention elements 20r extending from a surface thereof. The retention elements 20r may be structured to secure one or more extendible supports 30 (described below) to the cargo area liner 20, as described herein. In one or more arrangements, the retention elements 20r may be formed integrally with the rail cover portions 20g, 20n (described below). The retention elements may extend distances from surfaces of the rail cover portions suitable for the purposes described herein. In one example, the retention elements may each project from the rail cover portion a distance of about one inch.

In particular arrangements, the plurality of retention elements 20r includes a first row 20r-1 of three collinearly arranged retention elements positioned proximate a first end 20g-1 of the first rail cover portion 20g, and a second row 20r-2 of three collinearly arranged retention elements positioned adjacent the first row 20r-1 of three collinearly arranged retention elements. In addition, the plurality of retention elements may further include a third row 20r-3 of three collinearly arranged retention elements positioned proximate a second end 20g-2 of the first rail cover portion opposite the first end 20g-1, and a fourth 20r-4 row of three collinearly arranged retention elements positioned adjacent the third row 20r-3 of three collinearly arranged retention elements. The second rail cover portion 20n (described herein) may also include a plurality of retention elements 20r extending from a surface thereof and similar to the retention elements on the first rail cover portion 20g. Alternatively, any of a variety of other forms of retention elements (not shown) may be used to secure the extendible supports to the cargo area liner.

Also, a second sidewall portion 20h may be foldably connected to the floor portion 20a opposite the first sidewall portion 20c by a living hinge 22h. A second foldable intersection portion 26 may have a first section 26a and a second section 26b foldably connected to the first section 26a by a living hinge 22j. The second foldable intersection portion first section 26a may be foldably connected to the second sidewall portion 20h by a living hinge 22k, and the second foldable intersection portion second section 26b may be foldably connected to the front wall portion 20b by a living hinge 22m.

The second foldable intersection portion 26 may be being structured to facilitate folding of the second foldable intersection portion first and second sections 26a, 26b with respect to each other so as to form a second flap 26c (FIG. 2A) responsive to folding one of the front wall portion 20b and the second sidewall portion 20h with respect to the floor portion 20a, and subsequently folding the other one of the front wall portion 20b and the second sidewall portion 20h with respect to the floor portion 20a and in a direction toward the one of the floor portion 20a and the second sidewall portion 20h. The second flap 26c (which may extend between the front wall portion 20b and the second sidewall portion 20h) may be structured to be rotatable to enable contact between the second flap 26c and any of the front wall portion 20b and the second sidewall portion 20h.

In addition, a second rail cover portion 20n may be foldably connected to the second sidewall portion 20h by a living hinge 22n. The second rail cover portion 20n may be structured to reside opposite and cover the top of a second sidewall rail 19n of the vehicle opposite the first sidewall rail when the liner 20 is mounted in the cargo bed 19. The second rail cover portion 20n may also include a plurality of retention elements 20r extending from a surface thereof, similar to those located on the first rail cover portion 20g.

Figure 3:
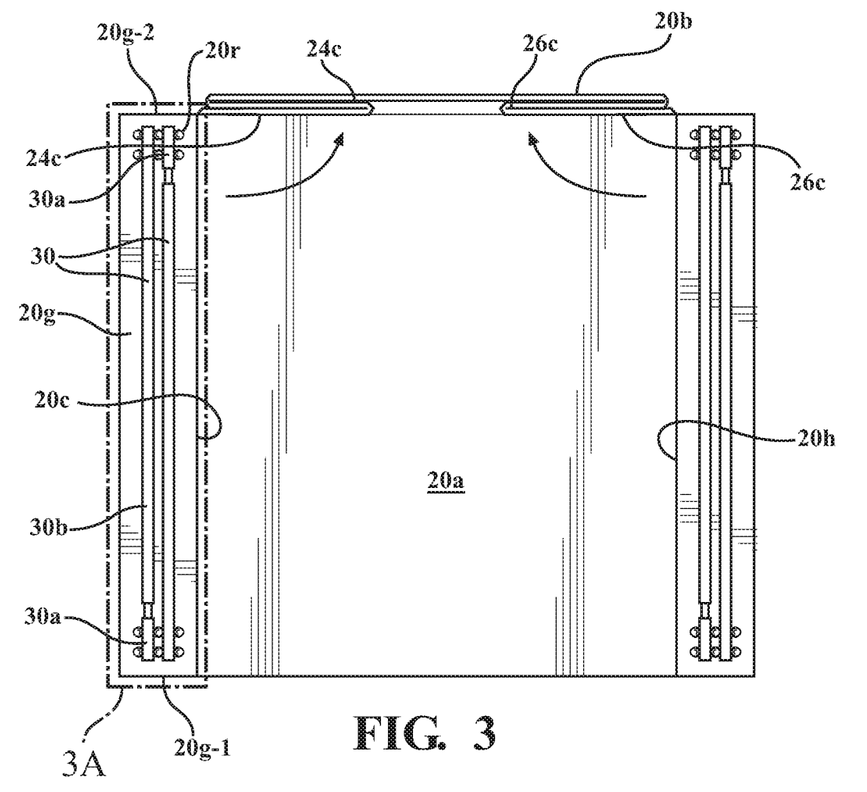
FIG. 3 is a schematic plan view of rail cover portions of the foldable cargo area liner of FIG. 1 when the liner is in a folded condition and mounted in a cargo bed.

FIGS. 2A-3 illustrate a process of folding the cargo area liner 20 into a configuration designed to conform to the shape of a cargo bed 19. The folded cargo area liner 20 may then be mounted in the cargo bed 19 to protect the cargo bed. Referring to FIGS. 1, 2A and 2B, first sidewall portion 20c and front wall portion 20b may be folded upwardly toward each other. This may enable the first foldable intersection portion 24 to fold as shown, with first section 24a folding with respect to the first sidewall portion along living hinge 22e and the second section 24b folding with respect to the front wall portion 20b along living hinge 22f. At the same time, the first and second sections 24a, 24b fold with respect to each other along living hinge 22d, which moves toward floor portion 20a. The first section 24a and the second section 24b may move toward each other to form flap 24c. The flap 24c may extend between the folded front wall portion 20b and the folded first sidewall portion 20c, as shown.

The first section 24a and the second section 24b may be detachably secured in contact with each other to help maintain the front wall portion 20b and the first sidewall portion 20c in their folded conditions. As used herein, "detachably secured" refers to a securement mechanism and/or method designed to enable the element or elements being secured to be repeatedly detached from (and re-attached to) each other without damage to the elements. In one example, known hook and loop fasteners (such as Velcro®) may be used for the detachable securement. The resulting flap 24c may also be rotatable to contact (and be detachably secured to) either one of the front wall portion 20b and the first sidewall portion 20c, as shown in FIG. 3. Securement of the flap 24c to one of the front wall portion 20b and the first sidewall portion 20c may further aid in securing the cargo area liner 20 in a folded configuration, thereby facilitating positioning of the liner in the cargo bed 19.

Figure 4:
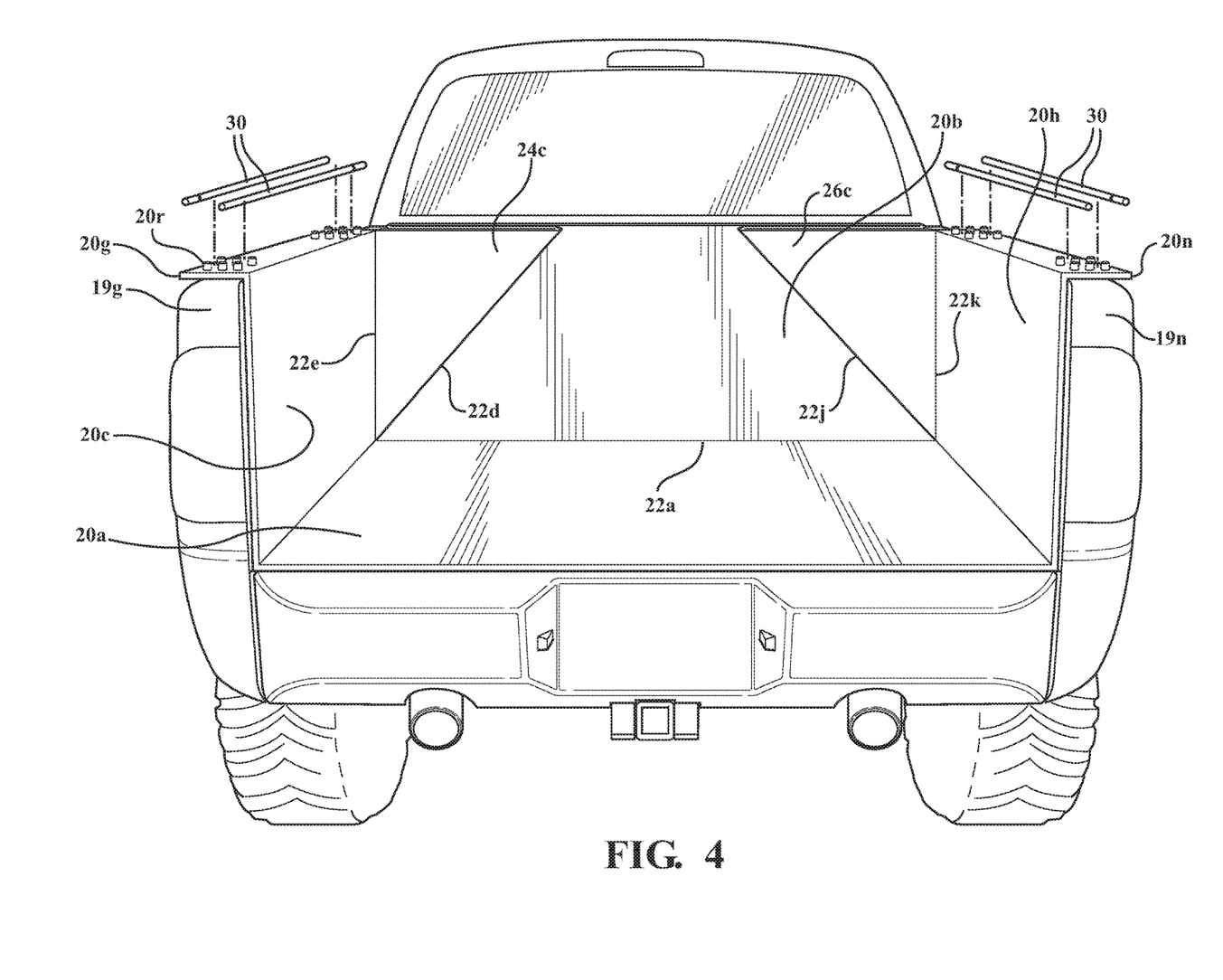
FIG. 4 is a schematic perspective view of the liner of FIG. 2B installed in the vehicle cargo bed.

The procedure just described may be repeated (or performed simultaneously) with the front wall portion 20b and the second sidewall portion 20h, to raise the second sidewall portion to its folded configuration. A second flap 26c formed from first and second sections 26a, 26b of the second foldable intersection portion 26 may then be detachably secured together and/or to the second sidewall portion 20h or to the front wall portion 20b, as shown in FIG. 3. The folded cargo area liner 20 may then be positioned and detachably secured in the vehicle cargo bed 19, as shown in FIGS. 2B and 4.

After the other portions of the cargo area liner 20 have been folded as just described and/or after the folded portions of the liner have been positioned in the cargo bed, the first rail cover portion 20g may be folded along living hinge 22g and detachably secured to the first sidewall rail 19g to cover the rail. Also, the second rail cover portion 20n may be folded along living hinge 22n and detachably secured to the second sidewall rail 19n to cover the rail.

Figure 3A:
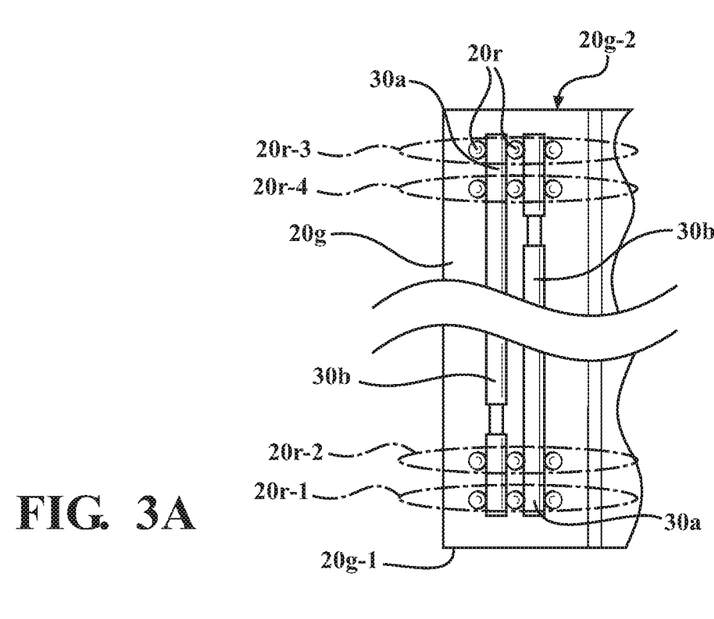
FIG. 3A is a schematic detail view of a rail cover portion of the foldable cargo area liner of FIG. 3, showing mounting of extendible supports to the rail cover portion.
Figure 5:
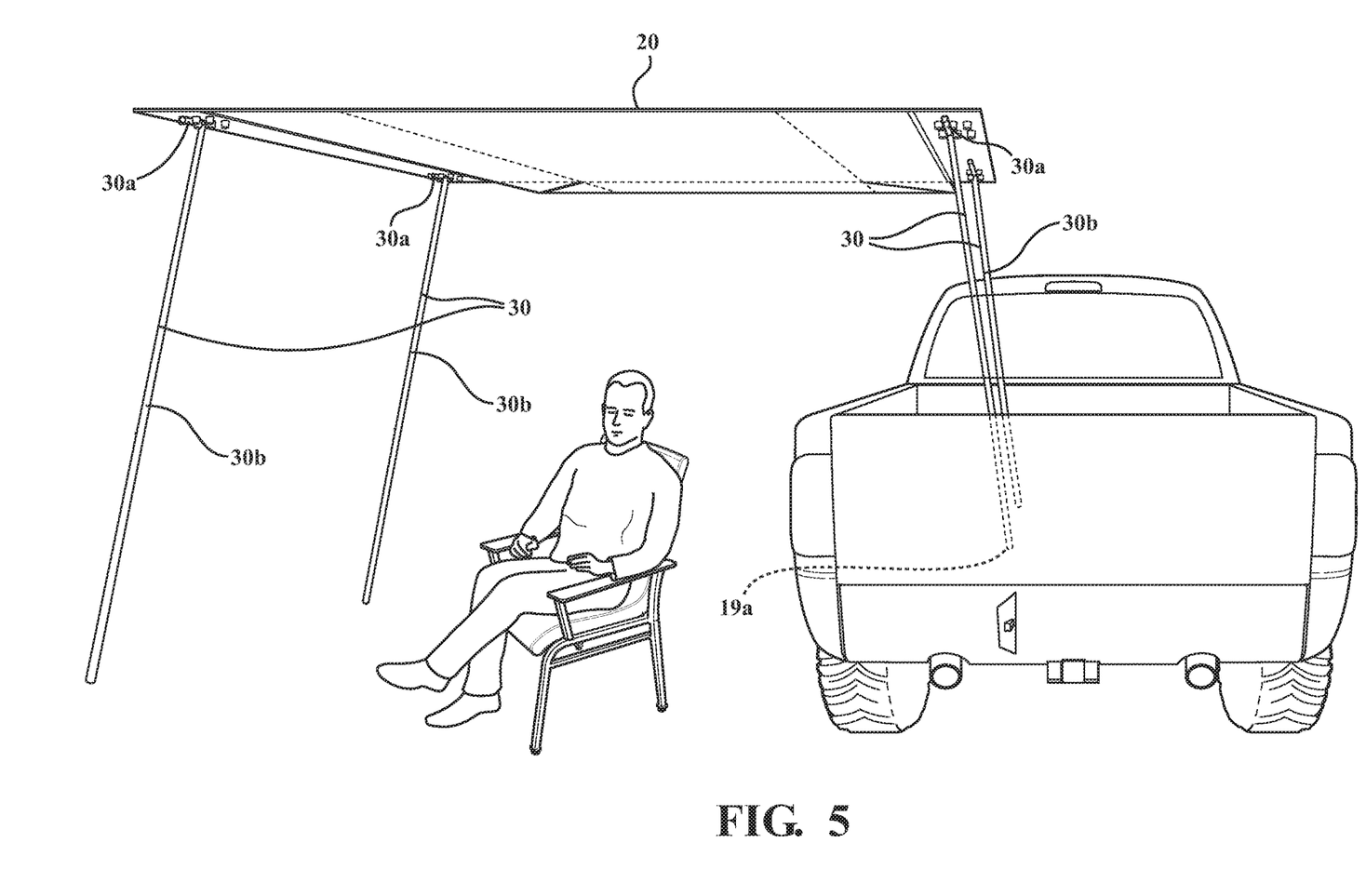
FIG. 5 is a schematic side view of an extra-vehicular application of the foldable cargo area liner, showing the liner as reconfigured for use as an awning.

Referring to FIGS. 3, 3A, and 5, in one or more arrangements, each extendible support 30 may include a first portion 30a structured to be received between a first pair of adjacent retention elements 20r so as to form an interference fit between the first portion 30a and the first pair of adjacent retention elements proximate one end of an associated rail cover portion. Each extendible support 30 may also include a second portion 30b rotatably coupled to the first portion 30a and structured to be received between a second pair of adjacent retention elements 20r so as to form an interference fit between the extendible support second portion 30b and the second pair of adjacent retention elements 20r proximate an opposite end of the rail cover portion. The retention elements 20r may detachably secure the extendible supports 30 to the rail cover portions 20g and 20n.

In particular arrangements, the first portion 30a of the extendible support 30 is a mounting portion and the second portion 30b of the extendible support 30 is a telescoping portion structured to be extendible from the mounting portion 30a to a support surface G1 spaced apart from the cargo area liner 20, to suspend the cargo area liner above the support surface G1. The support surface G1 may be, for example, a ground surface exterior of the vehicle. Alternatively, the support surface may be a portion of the vehicle. The segments of the telescoping portion may be secured in desired extended positions relative to each other using any suitable means, for example spring-loaded buttons which are manually actuatable by a user.

When extended to desired lengths, the extendible supports 30 act to support the cargo area liner 20 in a configuration usable outside the vehicle when the liner is in an unfolded condition. In one arrangement, the cargo area liner 20 may be removed from the vehicle and unfolded to the condition shown in FIG. 1. The liner 20 may then be turned upside down so that the sidewall rail cover portions 20g, 20n are facing downwardly. The telescoping second portions 30b of the supports 30 may be removed from between the retention elements 20r holding them, then rotated with respect to their respective mounting portions 30a, which remain secured to their respective rail cover portions. Because a mounting portion 30a is attached to each end of a rail cover portion, the two telescoping second portions 30b may be rotated away from the respective rail cover portion in opposite directions so as to extend from opposite ends of the rail cover portion after being rotated. The telescoping second portions 30b may then be extended to whatever lengths are suitable for supporting the unfolded liner 20 in a given application.

Referring to FIG. 5, in one particular example, the unfolded liner 20 may be arranged and supported as an awning covering a ground area G1 to one side of the vehicle. Telescoping second portions 30b may be extended to relatively greater lengths to reach the ground surface G1, while telescoping second portions 30b are extended to relatively shorter lengths to reach the floor 19a of the uncovered cargo bed 19.

Figure 6:
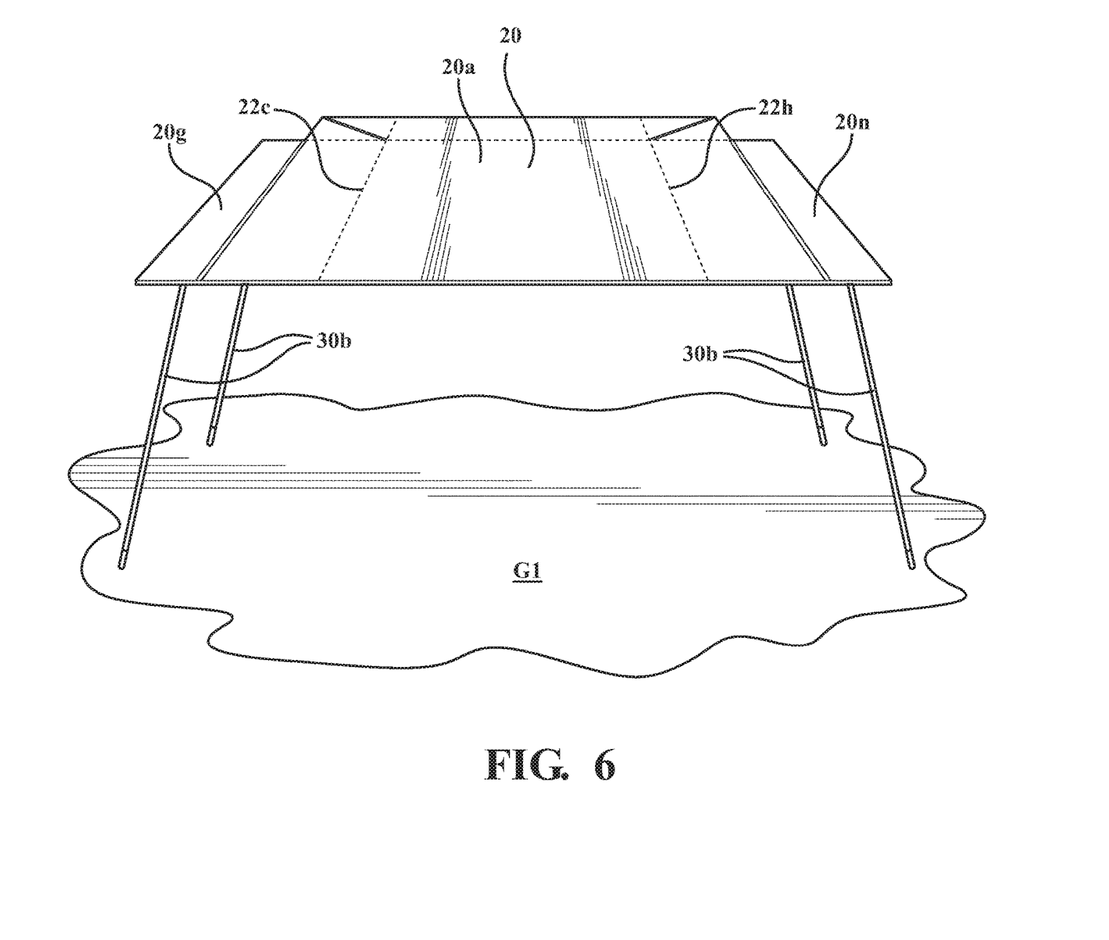
FIG. 6 is a schematic side view of an extra-vehicular application of the foldable cargo area liner, showing the liner as reconfigured for use as a table.

Referring to FIG. 6, in another application, the unfolded liner 20 may be arranged and supported by suitably extended telescoping second portions 30b as a table on a ground surface G1.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A single-piece foldable cargo area liner comprising:
   a floor portion;
   a front wall portion foldably connected to the floor portion;
   a first sidewall portion foldably connected to the floor portion along a living hinge;
   a first foldable intersection portion having a first section and a second section foldably connected to the first section, the first section being foldably connected to the first sidewall portion along another living hinge, the second section also being foldably connected to the front wall portion, the first foldable intersection portion being structured to facilitate folding of the first and second sections with respect to each other so as to form a first flap responsive to folding one of the front wall portion and the first sidewall portion with respect to the floor portion, and folding of the other one of the front wall portion and the first sidewall portion with respect to the floor portion and in a direction toward the one of the floor portion and the first sidewall portion, the first flap extending between the front wall portion and the first sidewall portion, the first flap being structured to be rotatable to enable contact between the first flap and either one of the front wall portion and the first sidewall portion; and
   a first rail cover portion foldably connected to the first sidewall portion along yet another living hinge, wherein the another living hinge extends between, and intersects, the living hinge and the yet another living hinge.

2. The cargo area liner of claim 1 further comprising:
   a second sidewall portion foldably connected to the floor portion opposite the first sidewall portion; and
   a second foldable intersection portion having a first section and a second section foldably connected to the second intersection portion first section, the second foldable intersection portion first section being foldably connected to the second sidewall portion, the second foldable intersection portion second section being foldably connected to the front wall portion, the second foldable intersection portion being structured to facilitate folding of the second foldable intersection portion first and second sections with respect to each other so as to form a second flap responsive to folding one of the front wall portion and the second sidewall portion with respect to the floor portion, and folding the other one of the front wall portion and the second sidewall portion with respect to the floor portion and in a direction toward the one of the floor portion and the second sidewall portion, the second flap extending between the front wall portion and the second sidewall portion, the second flap being structured to be rotatable to enable contact between the second flap and either one of the front wall portion and the second sidewall portion.

3. The cargo area liner of claim 1 wherein the first rail cover portion includes a retention mechanism positioned along a surface thereof and structured to secure at least one extendible support to the cargo area liner.

4. The cargo area liner of claim 3 wherein the retention mechanism includes a plurality of retention elements extending from a surface of the first rail cover portion, the plurality of retention elements having a first row of three collinearly arranged retention elements positioned proximate a first end of the first rail cover portion, and a second row of three collinearly arranged retention elements positioned adjacent the first row of three collinearly arranged retention elements.

5. The cargo area liner of claim 4 wherein the plurality of retention elements further includes a third row of three collinearly arranged retention elements positioned proximate a second end of the first rail cover portion opposite the first end, and a fourth row of three collinearly arranged retention elements positioned adjacent the third row of three collinearly arranged retention elements.

6. A cargo area liner assembly for a vehicle, the assembly comprising:
   a single-piece foldable cargo area liner in accordance with claim 1; and
   at least one extendible support, the support including a first portion detachably secured to the cargo area liner, and a second portion coupled to the first portion and structured to be extendible to a support surface spaced apart from the cargo area liner.

* * * * *